United States Patent Office 2,725,130
Patented Nov. 29, 1955

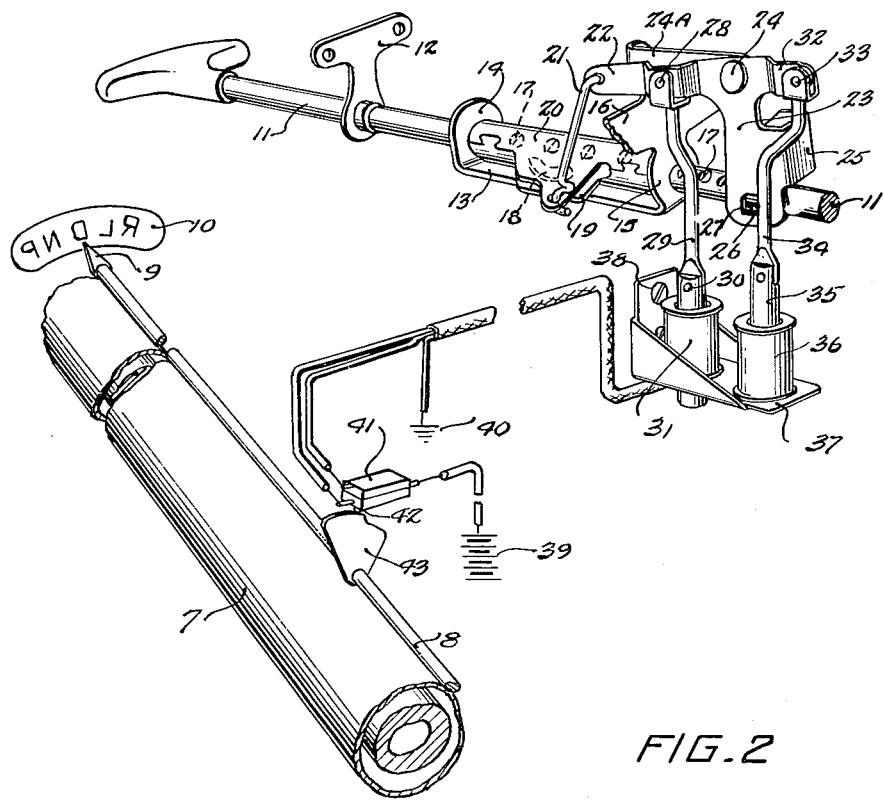

2,725,130

SOLENOID OPERATED EMERGENCY BRAKE

Joseph F. Martin, Detroit, Mich.

Application July 20, 1954, Serial No. 444,444

5 Claims. (Cl. 192—4)

This invention relates to automotive devices, and has particular reference to a device for automatically engaging and releasing the emergency brake of a motor vehicle.

An object of the invention is to generally improve devices such as disclosed in Patent No. 2,656,025 issued to me on October 20, 1953, and devices such as disclosed in my co-pending application, Serial No. 444,442, filed July 20, 1954, of which this may be considered a continuation in part.

Another object of the invention is to provide an automatic electric mechanism for engaging and disengaging the emergency brake, which mechanism may readily be installed on old or new motor vehicles such as are equipped with conventional emergency brake mechanisms, a gear shift lever or automatic transmission.

Another object of the invention is to provide electric means for engaging and disengaging the emergency brake simultaneously with the changing of the position of the transmission speed selector mechanism or the conventional gear shift lever positioned on the steering column.

Another object of the invention is to provide electric power means for engaging and disengaging the emergency brake mechanism, which power means are controlled by the manual operation of selecting pre-determined positions on the automatic transmission mechanism without in any way interferring with the normal functioning of the automatic transmission.

The foregoing and other objects and advantages of the invention will become more apparent as the description proceeds, reference being made from time to time to the accompanying drawing forming part of the within disclosure, in which drawing:

Fig. 1 is a perspective view of a mechanism embodying the invention, and illustrating the electric power operated elements in relation to the hand brake rod, the vehicle steering column and the speed selector mechanism of a vehicle having an automatic transmission.

Fig. 2 is a diagrammatic view illustrating the circuits and controls employed in the structure illustrated in Fig. 1.

Referring now more particularly to the drawing, it will be understood that in the embodiment herein disclosed, the reference character 7 indicates the steering column of a motor vehicle having an automatic transmission which is controlled by means of the speed selector rod 8, which is provided with an indicator 9 arranged to indicate on the speed selector panel 10 the gear changes and speeds within the range of the automatic transmission. The reference character 11 indicates the emergency brake hand rod which is connected to the emergency brake pull cable (not shown) and which is normally urged into released position by means of a spring (not shown) which comprise parts of the conventional emergency brake mechanism of the motor vehicle. The rod 11 is supported at the front by means of a bearing bracket 12 which is preferably secured to the rear of the instrument panel of the motor vehicle and the rod 11 is supported at the rear by means of the cradle 13 having end bearing members 14 and 15. The cradle 13 has an extension member 16 whereby it is secured to the driver's side of the fire wall (not shown) of the vehicle body. Machined on the rod 11 is a plurality of ratchet teeth 17 which are arranged to be engaged by a locking pawl 18, which is spring backed and is pivoted in the pawl supporting member 19, which is formed integrally with the sleeve 20, which is arranged to rotate about the rod 11 and which is held against endwise movement on the rod 11 by means of the end bearing members 14 and 15. The pawl carrying member 19 is connected by means of a link 21 to the upper end 22 of a bell crank 23, which is pivoted, as at 24, to an extension 24A formed on the member 15. The bell crank 23 has a yoke portion 25 through which is extended the rod 11 and to which it is connected by means of a pin 26 which engages the slot 27 formed in the yoke portion 25.

The end 22 of the bell crank 23 is pivoted, as at 28, to a push-pull rod 29, which is connected to the core 30 of a solenoid 31. The bell crank 23 is provided with another arm 32, which is pivoted, as at 33, to a push-pull rod 34, which in turn is connected to the core 35 of a second solenoid 36. The solenoids 31 and 36 are mounted on a suitable bracket 37 which is preferably secured, as at 38, to the engine side of the fire wall (not shown) of the vehicle body. The solenoids 31 and 36 are supplied with energy from the car storage battery 39 and the circuits are grounded as at 40. A double throw microswitch 41 is positioned in the solenoid circuits and is adapted to be actuated by the switch plunger 42 which rides on a cam plate 43, which is carried on, and rocks with the rotation of, the speed selector rod 8.

The operation of the device is as follows:

When the speed selector 9 indicates "D" for "Drive," the mechanism will be in the position shown in Figs. 1 and 2. In this position the microswitch 41 will be set by the cam plate 43 to close the switch, to permit electrical energy from the battery 39 to flow through the line 44 to the solenoid 31. Upon the energizing of the solenoid 31, the core 30 will be pulled downwardly and with it the rod 29 and the end 22 of the bell crank 23. The downward movement of the end 22 of the bell crank 23 pushes the rod 11 downwardly, at the same time rocking the pawl carrier 19 downwardly and moving the pawl 18 out of alignment with the ratchet teeth 17. This will free the rod 11 so that it may return to the emergency brake release position under the influence of the emergency brake spring (not shown).

The parts will remain in the same position when the indicator 9 is moved to "L" for "Low" or "R" for "Reverse." When the indicator 9 is moved to "N" for "Neutral" or "P" for "Park," the cam plate 43 will be rocked to the left allowing the switch plunger 42 to drop on the face of the cam. This throws the contact element of the switch 41 to the position shown by the dotted line, permitting the electrical energy from the battery 39 to enter the line 45 to energize the solenoid 36. Energizing the solenoid 36 causes the downward movement of the core 35, the rod 34, and the arm 32.

By the same token, the arm 22 is rocked upwardly, which causes the pawl carrier 19 to also rock upwardly under the influence of the linkage 21. This will bring the pawl 18 into alignment with the ratchet teeth 17. The continued downward pull of the rod 34 causes the inward movement of the lower end of the bell crank 23, which in turn causes the movement to the left of the rod 11 by reason of the engagement of the wall of the slot 27 with the pin 26. The movement to the left of the rod 11 automatically sets the emergency brake. The brakes will remain set until the selector 9 is again moved to "D" for "Drive," "L" for "Low" or "R" for "Reverse," which will cause the parts to return to the position shown in Figs. 1 and 2, as previously described.

Having described my invention, what I claim and desire to secure by Letters Patent is:

1. In a motor vehicle having an emergency brake mechanism, including a push-pull rod having ratchet teeth thereon, and a speed selector mechanism, including a speed selector indicator and rod, the combination of a bracket for supporting said push-pull rod, a sleeve mounted for rotation on said push-pull rod, a spring backed pawl carried on an extension of said sleeve and alignable with said ratchet teeth, a bell crank, one arm of said bell crank having linkage connected to said sleeve and arranged to move said pawl into and out of alignment with said teeth, said arm being also pivoted to a rod which is connected to the core of a solenoid, another arm of said bell crank being pivoted to a rod which is connected to the core of a second solenoid, and a third arm of said bell crank being connected to said push-pull rod, said solenoids being connected to a source of electrical energy, a double acting switch for controlling the flow of electrical energy to said solenoids, and a cam plate on the selector rod of said speed selector mechanism, said cam plate being arranged to actuate said switch.

2. The structure of claim 1, in which said bracket serves to prevent the endwise movement of said sleeve on said push-pull rod and also serves as means for pivotally supporting said bell crank.

3. The structure of claim 1, in which the connection between the third arm of said bell crank and said push-pull rod is arranged to first cause the movement of said sleeve by said bell crank before said push-pull rod is actuated by said third arm of said bell crank.

4. The structure of claim 1, in which said pawl is held out of engagement with said ratchet teeth by the first arm of said bell crank when the indicator of said speed selector mechanism is in driving position, and said pawl is held in alignment with said ratchet teeth by the first arm of said bell crank when said indicator is in neutral or parking position.

5. The structure of claim 1, in which the said solenoids are connected to the electrical system of said motor vehicle.

References Cited in the file of this patent

UNITED STATES PATENTS

| | | |
|---|---|---|
| 2,059,069 | Weiss | Oct. 27, 1936 |
| 2,251,787 | Gardiner | Aug. 5, 1941 |